United States Patent
Khoreva et al.

(10) Patent No.: US 12,354,343 B2
(45) Date of Patent: Jul. 8, 2025

(54) GENERATIVE ADVERSARIAL NETWORK FOR CLASSIFYING AN IMAGE BY MASKING AND GLOBALLY POOLING A FEATURE MAP

(71) Applicant: Robert Bosch GmbH, Stuttgart (DE)

(72) Inventors: Anna Khoreva, Stuttgart (DE); Vadim Sushko, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 345 days.

(21) Appl. No.: 17/813,468

(22) Filed: Jul. 19, 2022

(65) Prior Publication Data

US 2023/0031755 A1   Feb. 2, 2023

(30) Foreign Application Priority Data

Jul. 29, 2021   (EP) .................................... 21188433

(51) Int. Cl.
*G06V 10/82*   (2022.01)
*G06V 10/26*   (2022.01)
(Continued)

(52) U.S. Cl.
CPC ............. *G06V 10/82* (2022.01); *G06V 10/26* (2022.01); *G06V 10/764* (2022.01); *G06V 10/7715* (2022.01); *G06V 10/7747* (2022.01)

(58) Field of Classification Search
None
See application file for complete search history.

(56) References Cited

U.S. PATENT DOCUMENTS

| | | | | |
|---|---|---|---|---|
| 10,346,693 B1 * | 7/2019 | Kim | ..................... | G06V 10/454 |
| 10,902,291 B1 * | 1/2021 | Kim | ..................... | G06F 18/217 |

(Continued)

FOREIGN PATENT DOCUMENTS

| | | | | |
|---|---|---|---|---|
| EP | 4124998 A1 * | 2/2023 | ............. | G06N 3/045 |
| WO | WO-2021018811 A1 * | 2/2021 | ......... | G06F 18/2413 |

OTHER PUBLICATIONS

Zhang et al., "Datasetgan: Efficient Labeled Data Factory With Minimal Human Effort," Cornell University, 2021, pp. 1-11. extension:// elhekieabhbkpmcefcoobjddigjcaadp/https://arxiv.org/pdf/2104.06490.pdf Downloaded Jul. 19, 2022.

(Continued)

*Primary Examiner* — Akwasi M Sarpong
*Assistant Examiner* — Pawandeep Dhingra
(74) *Attorney, Agent, or Firm* — NORTON ROSE FULBRIGHT US LLP (57) ABSTRACT

A generative adversarial network. The generative adversarial network includes: a generator configured for generating an image and a corresponding label map; a discriminator configured for determining a classification of a provided image and a provided label map, wherein the classification characterizes whether the provided image and the provided label map have been generated by the generator or not and determining the classification comprises the steps of: determining a first feature map of the provided image; masking the first feature map according to the provided label map thereby determining a masked feature map; globally pooling the masked feature map thereby determining a feature representation of the provided image masked by the provided label map; determining a classification of the image based on the feature representation.

8 Claims, 4 Drawing Sheets

(51) Int. Cl.
*G06V 10/764* (2022.01)
*G06V 10/77* (2022.01)
*G06V 10/774* (2022.01)

(56) References Cited

U.S. PATENT DOCUMENTS

| | | | | |
|---|---|---|---|---|
| 2016/0358337 | A1* | 12/2016 | Dai | G06T 7/11 |
| 2019/0171903 | A1* | 6/2019 | Vajda | G06T 7/75 |
| 2019/0317739 | A1* | 10/2019 | Turek | G06N 3/045 |
| 2020/0143171 | A1* | 5/2020 | Lee | G06V 20/49 |
| 2022/0156939 | A1* | 5/2022 | Homayounfar | G06V 10/945 |
| 2023/0206616 | A1* | 6/2023 | Barsopia | G06V 10/82 |
| | | | | 382/155 |
| 2024/0078680 | A1* | 3/2024 | Zheng | G06T 7/11 |

OTHER PUBLICATIONS

Feng et al., "Generative Adversarial Networks Based on Collaborative Learning and Attention Mechanism for Hyperspectral Image Classification," Remote Sensing, vol. 12, No. 1149, 2020, pp. 1-26.

\* cited by examiner

GENERATIVE ADVERSARIAL NETWORK FOR CLASSIFYING AN IMAGE BY MASKING AND GLOBALLY POOLING A FEATURE MAP

CROSS REFERENCE

The present application claims the benefit under 35 U.S.C. § 119 of European Patent Application No. EP 21 18 8433.3 filed on Jul. 29, 2021, which is expressly incorporated herein by reference in its entirety.

FIELD

The present invention concerns a generative adversarial network for processing and generating images, a method for training the generative adversarial network, a method for training a machine learning system, a method for classifying images by means of the generative adversarial network, a training system, a computer program and a machine-readably storage medium.

BACKGROUND INFORMATION

Zhang et al. "DatasetGAN: Efficient Labeled Data Factory with Minimal Human Effort", Apr. 20, 2021, https://arxiv.org/abs/2104.06490v2 describes a generative adversarial network for generating images and label maps.

Machine learning system such as neural networks are used in almost all fields of technology. However, the performance of such machine learning systems critically hinges on the data they are trained with. Satisfactory generalization capabilities of machine learning systems can typically only be achieved when training with a large and diverse dataset.

Especially for computer vision tasks such as semantic segmentation or object detection, gathering such a dataset is a difficult undertaking as labeling the required data consumes a lot of time of expert human labelers. It would thus be desirable to devise a way that allows for automatically generating labels for semantic segmentation or object detection, preferably while also allowing for generating the images corresponding to the generated labels.

An advantage of the generative adversarial network provided in according to the present invention is that it allows for accurately generating images and their corresponding semantic segmentation label or object detection label. As a bonus feature, the generative adversarial network allows for accurately classifying whether a provided image and a provided corresponding label is from a distribution that was used for training the generative adversarial network.

SUMMARY

In a first aspect, the present invention concerns a generative adversarial network. In accordance with an example embodiment of the present invention, the generative adversarial network includes:
- a generator configured for generating an image and a corresponding label map;
- a discriminator configured for determining an output characterizing a classification of a provided image and a provided label map, wherein the classification characterizes whether the provided image and the provided label map have been generated by the generator or not and determining the classification comprises the steps of:
  Determining a first feature map of the provided image;
  Masking the first feature map according to the provided label map thereby determining a masked feature map;
  Globally pooling the masked feature map thereby determining a feature representation of the provided image masked by the provided label map;
  Determining a classification of the image based on the feature representation.

The generative adversarial network (GAN) as provided according to the present invention may be understood as a specialized form of conventional GANs. It is model from the field of machine learning that comprises two components, namely the generator and the discriminator. Compared to conventional GANs, the generator is configured to not only generate images but also label maps corresponding to the respective images.

A label map may be understood as characterizing a label of an image, which the label map corresponds to. The term "corresponding" can be understood as a 1-to-1 relationship of a label map and the image the label map characterizes. In other words, the label map may be understood as characterizing meta-information about the image. The label map may especially be understood as characterizing class memberships of pixels of the image the label map corresponds to. The label map may, for example, be given in the form of a matrix of the same width and height as the image, wherein an element of the matrix characterizes a class of a pixel of the image. In this case, the element is characterized by a position along the width and height of the matrix and characterizes the class of the pixel at the same location in the image. Alternatively, the label map may be given by a tensor, preferably a three dimensional tensor of a certain height, width, and depth. The height and width may preferably be the same as for the image, while the tensor may preferably contain as many elements along its depth dimension as there are possible classes for the pixels of the image. In this case, the tensor may especially encode the class of a pixel by means of a one-hot encoding, wherein the one-hot encoding is a slice of the tensor at a certain position along the width and height of the tensor, i.e., the one-hot encoding is a vector.

A label map may, however, also be given as a more abstract definition of class memberships. For example, a label map may be given by a bounding box or a plurality of bounding boxes, each characterizing rectangular regions of a corresponding image. Each of the bounding boxes may further characterize information about the class of an object depicted in the image at the location of the respective bounding box, e.g., contain a class label or other information associated with the class. The label map does, however, not need to be restricted to a bounding box or a plurality of bounding boxes. It can in general be any kind of polygon or a plurality of any kinds of polygons, preferably but not necessarily convex polygons. The polygon can be understood as denoting regions of the image which belong to a certain class. For example, objects in an image may be annotated by means of convex hulls (i.e., convex polygons).

If a label map characterizes a polygon or a plurality of polygons (including bounding boxes), the pixels of an image corresponding to the label, which do not fall into any of the polygons characterized as label map, may be understood as a special class, typically referred to as "background class".

If a label map characterizes a polygon or a plurality of polygons, the label map may be converted to a label map characterizing a semantic segmentation by assigning each pixel in an image corresponding to the label map the class of a polygon it falls into or the background class if it does not fall into any polygon.

In accordance with an example embodiment of the present invention, the GAN further comprises a discriminator, which is configured to determine an output characterizing a classification of the provided image and the provided label map. In other words, the discriminator is configured to classify the provided image and the provided label map. As is common for GANs, the discriminator seeks to classify whether its input (i.e., the provided image and the provided label map) has been generated by the generator or not. In common GAN terminology, the class referring to images and label maps generated by the generator may also be called "fake class" while the other class may be called "true class" or "real class". The discriminator is configured to determine the first feature map based on the image. The first feature map may, for example, be the image itself. Preferably, however, the first feature map may be the output of at least one convolutional layer, preferably a plurality of convolutional layers. For example, the discriminator may comprise a block of convolutional layers, which are connected as a feed forward neural network. This block may be understood as a sub-neural network of the discriminator. The sub-neural network takes the provided image as input and determines a feature map from it.

A feature map may be understood as characterizing information about an image. A feature map may preferably be given in the form of a three dimensional tensor. The tensor comprises a height axis, a width axis and a depth axis. The tensor may be understood as comprising vectors (along the depth axis), located at certain spatial positions along the height axis and width axis of the tensor. In this sense, the first feature map may be given by a three dimensional tensor with the same width and height as the provided image. The vector at a certain spatial position of the tensor can then be understood as a feature vector characterizing a pixel of the image, wherein the image has the same spatial position in the image as has the feature vector in the tensor (for example, denoted by coordinates along the width and height axis of the tensor and the image respectively).

In the following, when referring to feature maps and their tensor characteristics, it is also understood that if an image is used as feature map, the feature map can still be understood as a tensor with as many elements along the depth dimension as there are channels in the image.

In accordance with an example embodiment of the present invention, the discriminator is configured to mask the first feature map according to the provided label map. In this sense, masking may be understood as setting certain elements of the first feature map to a predefined value, preferably zero. In particular, the first feature map may be masked to set all elements of the first feature map to the predefined value, which do not correspond to a class characterized by the provided label map. Technically, this may be achieved by first determining a matrix of the same height and width as the provided image, wherein an element of the matrix is set to one if a pixel having the same spatial position in the image as does the element in the matrix belongs to the class. Otherwise the element may be set to zero. This way, a matrix is constructed which consists of zeros and ones only. The first feature map and the matrix may then be element-wise multiplied in order to determine the masked feature map. For this element-wise multiplication may especially be duplicated along the depth dimension of the first feature map (also known as the matrix being broadcasted across the first feature map).

The masked feature map is then processed by a global pooling operation. The masked feature map may be understood as a three dimensional tensor. This may also be understood as a plurality of matrices stacked along the depth dimension of the tensor. The global pooling operation may be understood as extracting the feature representation by extracting a single value from each matrix of the plurality of matrices. In other words, global pooling may be understood as a pooling operation in which the receptive field is the entire input. A pooling operation may especially be realized as a pooling layer of a neural network. The global pooling operation may preferably be a global average pooling operation. Other possible global pooling operations include global max pooling.

An advantage of the proposed GAN of the present invention is that the specific design of the generator and the discriminator allows for generating images that look like other images from a training dataset the GAN has been trained with while also being able to generate highly accurate label maps, i.e., annotations of the generated image. As an additional effect, the design of the discriminator allows for accurately predicting whether the provided image in combination with the provided label map look like data from the aforementioned training dataset. This may be especially advantageous for detecting whether the provided image in combination with the label map characterizes an image determined from, e.g., a sensor or if the image characterizes an image that has been tampered with. The inventors found that the high accuracy of the predictions of the discriminator are caused by its design, namely its possibility to mask out elements according to the provided label map thereby guiding the classification process to look at the objects as suggested by the provided label map. This way, the classification is based on more information than the image alone.

It should be noted that the proposed GAN of the present invention may especially be understood as a trained GAN, i.e., that the generator and the discriminator of the GAN have been trained in order to fulfill their desired purpose.

Preferably, the generator and the discriminator are realized as neural networks. As the GAN is configured for generating and/or classifying images, the generator and the discriminator may preferably be realized as convolutional neural networks.

The inventors found that the accuracy of the generated image and the generated label map as well as the classification accuracy of the discriminator can be improved if the generator and/or the discriminator are realized as neural networks, in particular deep neural networks.

Generating the image and the corresponding label map by the generator can preferably be achieved by means of providing at least one random number, preferably a plurality of random numbers, e.g., in the form of a vector, a matrix, or a tensor, as an input to the generator and determine the image and the label map as output of the generator given the input.

In accordance with an example embodiment of the present invention, it is possible that the provided label map characterizes a semantic segmentation of the provided image and a masked feature map is determined for a class characterized by the semantic segmentation. Preferably, a masked feature map is determined for each class characterized by the semantic segmentation.

This embodiment may be understood as determining at least one but preferably multiple masked feature maps, i.e., one masked feature map for each class present in the provided label map. The classification of the discriminator may then be based on whether each of the masked feature maps characterizes the provided image and the provided label map as originating from the generator or not. By determining a masked feature map for each class, the accuracy is further improved as the provided label map has to be accurate for all classes and not only one or a subset of classes. During training of the GAN, this guides the generator towards being able to generate more accurate label maps.

In accordance with an example embodiment of the present invention, it is also possible that the provided label map characterizes regions of the provided image and a masked feature map is determined for a class characterized by the regions. Preferably, a masked feature map is determined for each class characterized by the regions.

The provided label map may, for example, characterize polygonal regions of the image that belong to certain classes. A typical example for this is a bounding box, wherein the bounding box carries additional information about a class of an object enclosed by the bounding box in the image.

The advantage of this embodiment is similar to the embodiment using a semantic segmentation as provided label map, namely the discriminator being able to base its classification on whether each of the masked feature maps characterizes the provided image and the provided label map as originating from the generator or not.

In general, it is possible but not required that the generator generates label maps of the same type as the discriminator is configured for processing. For example, the generator may generate label maps in the form of a semantic segmentation and the discriminator may be configured to process a label map provided in the form of a semantic segmentation (and likewise in the case of label maps characterizing regions). However, it is also possible that the generator generates a different kind of label map as the discriminator is configured for. In this case, the generated label map be processed before being used as input of the discriminator. For example, if the generator generates label maps characterizing regions, a label map characterizing a semantic segmentation may be obtained by setting each element of the semantic segmentation to a class as characterized by the regions of the generated label map. Likewise, a generated label map characterizing a semantic segmentation may be transformed into a label map characterizing regions by determining convex hulls of connected elements of the semantic segmentation.

In other words, both a provided label map characterizing regions as well as a provided label map characterizing a semantic segmentation can be understood as characterizing a class membership of pixels of provided image.

The masked feature map may especially be determined for a class characterized by the semantic segmentation or characterized by the regions by setting all pixels of the first feature map, which do not belong to the class, to zero.

A pixel of the first feature map may especially be understood as a vector of a tensor characterizing the first feature map, wherein the vector is located along the depth dimension of the tensor and has a spatial position with respect to the width and height of the tensor. The expression "pixel of a tensor" may thus be understood as an analogy of a "pixel of an image". Masking the first feature map may then be achieved by setting certain pixels of the tensor to a predefined values. Setting a pixel to the predefined value may be understood as setting elements of the vector to the predefined value, particularly all elements of the vector to the predefined value. Advantageously, if the predefined value is zero, ensuing operations will implicitly regard the respective pixel as masked, thus taking into account how a discriminator is executed on a computer.

In further embodiments, it is possible that the discriminator is further configured to determine the classification based on a second feature map, wherein the second feature map is determined by applying a 1×1-convolution to the first feature map.

These embodiments may be understood as the discriminator being able to determine its classification based on the layout of the provided image. Preferably, the second feature map is the result of applying a single 1×1-convolution to the first feature map. Applying a 1×1-convolution may preferably be achieved by means of a convolutional layer comprising filters (preferably only a single filter) with a kernel size of 1×1. By applying the 1×1 convolution, the information of the first feature map is compressed. The inventors found that this compression enables the discriminator to also derive information about the layout of the provided image besides the content information derived from masking the first feature map. In other words, the discriminator is able to determine that while certain masked feature maps may in principle characterize meaningful objects, their position in the provided image may be vastly incorrect with respect to the images provided in a training dataset used for training the GAN (e.g., cars in the sky). The layout may be classified separately by the discriminator, i.e., the discriminator may output two classifications: one classification characterizing whether the masked feature maps characterizes content belongs to the fake class or the real class and another classification characterizing whether the layout characterizes content from the fake or the real class.

The inventors found that using the 1×1-convolution for determining a classification based on the layout of the provided image further improves the classification accuracy of the discriminator.

In another aspect, the present invention concerns a computer-implemented method for training a generative adversarial network according to an embodiment of the first aspect, wherein training comprises the steps of:

Generating a first image and a corresponding first label map from the generator of the generative adversarial network;

Determining, by the discriminator of the generative adversarial network, a first output characterizing a classification of the first image and the first label map;

Based on the first output, training the discriminator to classify the first image and the first label map into a first class, which characterizes images and label maps that have been generated by the generator;

Based on the first output, training the generator to generate images and corresponding label maps, which are classified into a second class, which characterizes images and label maps that have not been generated by the generator;

Determining, by the discriminator, a second output characterizing a classification of a provided second image and a provided second label map, wherein the second image and the second label map are not provided by the generator;

Based on the second output, training the discriminator to classify the second image and the second label map into the second class.

The second image and the second label map may especially be understood to originate from a training dataset of the GAN. Training the GAN may be understood as teaching the GAN to learn about a probability distribution of the images and corresponding label maps of the training dataset such that it is able to generate images and label maps that "look like" data from the training dataset.

The training method may be understood as the common zero-sum game approach for training generative adversarial networks. By virtue of the advantageous design of the GAN (i.e., its specific generator and its specific discriminator), the training method, however, determines a GAN that is more accurate with respect to generating images and corresponding label maps as well as classifying provided images and provided label maps. As training is conducted as a zero-sum game, improving the classification accuracy of the discriminator directly improves the accuracy of images and label maps generated by the generator. This is due to the fact that the generator has to be able to determine more and accurate outputs with respect to the training dataset in order to keep the zero-sum game balanced.

Training the GAN may preferably be achieved by means of a (preferably stochastic) gradient descent algorithm using a negative log-likelihood of the classification of the discriminator as loss function. If the discriminator determines multiple classifications, e.g., one for each masked feature map or classifications with respect to the second feature map, the negative log-likelihood values determined for each classification may be averaged in order to determine a loss value for the gradient descent algorithm.

Advantageously, the inventors found that the specific design of the GAN allows for training the GAN with even a very limited amount of training data. In fact, the GAN can be trained with a single image without experiencing common difficulties with such small training datasets such as overfitting or mode collapse.

In another aspect, the present invention concerns a computer-implemented method for training or testing a machine learning system comprising the steps of:
Determining an image and a corresponding label map from the generator of a generative adversarial network according to an embodiment of the GAN of this invention;
Training the machine learning system to determine an output characterizing the label map when provided the image as input or testing the machine learning system, to what degree an output of the machine learning system characterizes the label map when provided the image as input.

The method for training may be understood as a supervised training method using images generated (sometimes also referred to as synthesized) for training the machine learning system. The machine learning system may, for example, be a neural network, which is trained for image analysis.

The method for training may preferably comprise training the machine learning system with images and label maps from a training dataset as well as images and label maps generated by the generator of the GAN. Preferably, the GAN is trained with the training datasets previously to generating the images and label maps.

As more images and label maps can be obtained from the GAN in an automated fashion, the training method improves the accuracy of the machine learning system.

If used for testing, the method may be understood as generating a test dataset for the machine learning system to be tested. The degree to which the output of the machine learning system characterizes the label map may be understood as a metric for assessing a performance of the machine learning system. For example, if the machine learning system is configured for semantic segmentation, mean intersection over union may be used as metric. If the machine learning system is configured for object detection, mean average precision may be used as metric.

In another aspect, the present invention concerns a computer-implemented method for classifying an image and a corresponding label map, wherein the image and the corresponding label map are classified by the discriminator of a generative adversarial network according to an embodiment of the first aspect of this invention.

The method for classifying the image may be understood as assessing whether the image and the corresponding label map are part of the real class, i.e., are likely from a probability distribution characterized by a training dataset of the GAN. The method for classifying may, for example, be used to detect adversarial examples. For example, a machine learning system could be configured to determine a label map for an image. The image and the determined label map may then be forwarded to the discriminator. If the discriminator deems the image and the determined label map to belong to the real class, the label map may be further processed, e.g., by an autonomous device. Otherwise, determined label map may be rejected or disregarded in further processing.

Embodiments of the present invention will be discussed with reference to the following figures in more detail.

DETAILED DESCRIPTION OF EXAMPLE EMBODIMENTS

Figure 1:
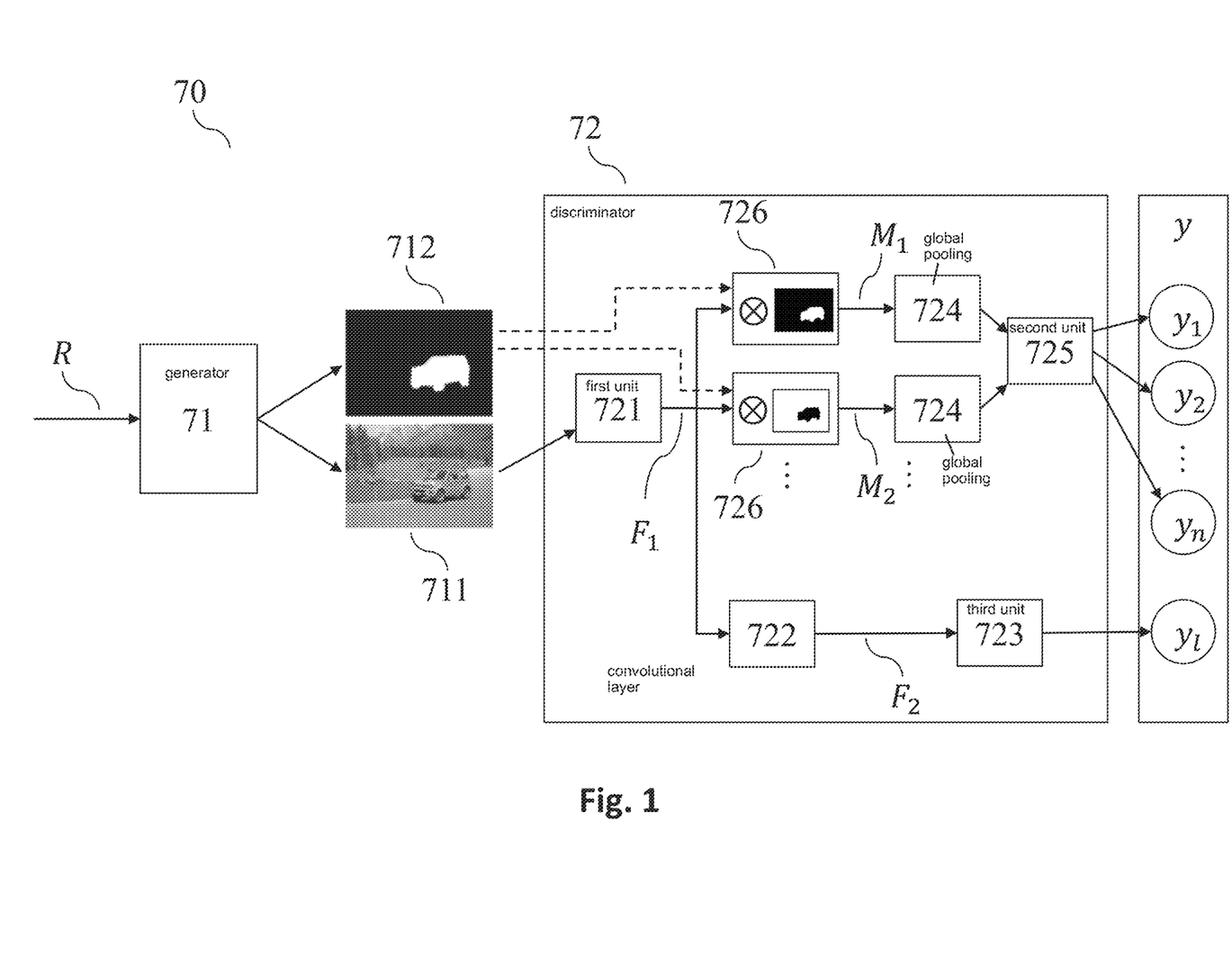
FIG. 1 shows a generative adversarial network, in accordance with an example embodiment of the present invention.

FIG. 1 shows a generative adversarial network, i.e., a GAN. The GAN comprises a generator (71), which is configured to determine an image (711) and a corresponding label map (712) as output based on a randomly drawn value (R) used as input. The randomly drawn value (R) may also be part of a plurality of randomly drawn values used as input of the generator (71), e.g., in the shape of a vector, a matrix, or a tensor. Determining an output from the generator (71) may also be referred to as generating an output. The generator (71) may preferably be realized as a neural network.

The GAN further comprises a discriminator (72), which is configured to accept a provided image (711) and a provided label map (712) and determine an output (y) characterizing a classification ($y_1$, $y_2$, $y_n$, $y_l$) of the provided image and the provided label map. The discriminator (72) may preferably be realized by a neural network.

For this the discriminator (71) may comprise an optional first unit (721), which is configured to determine a first feature map ($F_1$) based on the provided image (711). The first unit (721) may especially be a neural network, in particular a convolutional neural network. If the first unit (721) is a neural network, the first unit (721) may process the provided image (711) by forwarding it through the layers of the first unit (721). An output determined this way may then be used as the first feature map ($F_1$). Alternatively, the provided image (711) may be used as first feature map ($F_1$) directly.

The first feature map ($F_1$) is then masked according to the provided label map (712). In the embodiment, the provided label map (712) characterizes a semantic segmentation. In particular, the provided label map (712) may characterize a tensor of one-hot encodings of the classes of the pixels. The one-hot encodings may especially be pixels of the tensor, i.e., located along the depth dimension of the tensor and having spatial positions along the width and height of the tensor. For masking, the tensor may be sliced along the depth dimension in order to extract different matrices, each matrix consisting of zeros and ones. Each of these matrices corresponds to a class characterized by the provided label map. The different matrices may also be understood as different masks, wherein there exists a mask for each class. Each mask is then used in a masking operation (726) of the discriminator (72). The result of this masking operation (726) is preferably a masked feature map ($M_1$, $M_2$) for each mask, i.e., a masked feature map ($M_1$, $M_2$) for each class.

If the provided label map (712) characterizes a matrix of class indices, the provided label map may be converted into a tensor of one-hot encodings before the masking operations. Likewise, if the provided label map (712) characterizes regions, e.g., polygonal regions like bounding boxes, the provided label map (712) may be converted into a one-hot encoding before the masking operation. For this, each pixel in the provided image (711) may be assigned a class according to a region the pixel falls into. If the pixel does not fall into any region characterized by the provided label map (712), the pixel may be assigned to a "background" class. This way, a semantic segmentation is determined from the regions characterized by the provided label map (712). The semantic segmentation may then be used for masking as explained above.

The determined masked feature maps ($M_1$, $M_2$) are then processed by a global pooling operation (724). The global pooling operation may preferably be a global average pooling operation. In further embodiments, the global pooling operation may also be a global max pooling operation. The result of the global pooling operation may be understood as a feature representation characterizing the provided input image (711) masked according to a class of the provided label map (712). Preferably, the discriminator (72) determines feature representation for each of the masked feature maps ($M_1$, $M_2$).

The feature representations are then processed by a second unit (725) of the discriminator (72). The second unit (725) may especially be a neural network, in particular a multilayer perceptron, i.e., a fully connected neural network. For each feature representation, the second unit (725) may determine a classification ($y_1$, $y_2$, $y_n$), each classification characterizing whether the respective feature representation characterizes to a real class or a fake class. The second unit (725) may especially perform a multiclass classification wherein the fake class is one of the multiple classes that can be predicted from the second unit (725). In the embodiment, it is desirable that the second unit (725) predicts the fake class for each feature representation as the provided image (711) and the provided label map (712) originate from the generator (71). In further embodiments, the provided image (711) and the provided label map (712) may, for example, originate from a training dataset used for training the generative adversarial network (70). In this case, it would be desirable for the second unit (725) to predict the feature representations to fall into a real class. If the second unit (725) is configured for multiclass classification, it is desirable that the second unit (725) predicts a class characterizing the class that was used for masking in the process of determining a feature representation. The classifications ($y_1$, $y_2$, $y_n$) determined by the second unit (725) are then provided as output (y) of the discriminator (72).

In further embodiments, it is possible that the discriminator (72) comprises operation units for assessing, whether the layout of the provided image indicates that the image has been provided from the generator (71) or not. Preferably, the discriminator (72) comprises a convolution layer containing a single filter of kernel size 1×1. The convolution layer processes the first feature map ($F_1$) thereby determining a second feature map ($F_2$). The second feature map ($F_2$) may then be used as input of a third unit (723), wherein the third unit (723) is preferably a neural network, in particular a convolutional neural network. The third unit (723) takes the second feature map ($F_2$) as input and determines a classification ($y_l$) characterizing the second feature map ($F_2$) and thereby characterizing the layout of the provided image (711). The classification ($y_l$) may especially be a binary classification characterizing either the real class or the fake class. The classification ($y_l$) may then also be provided in the output (y) of the discriminator (72).

Figure 2:
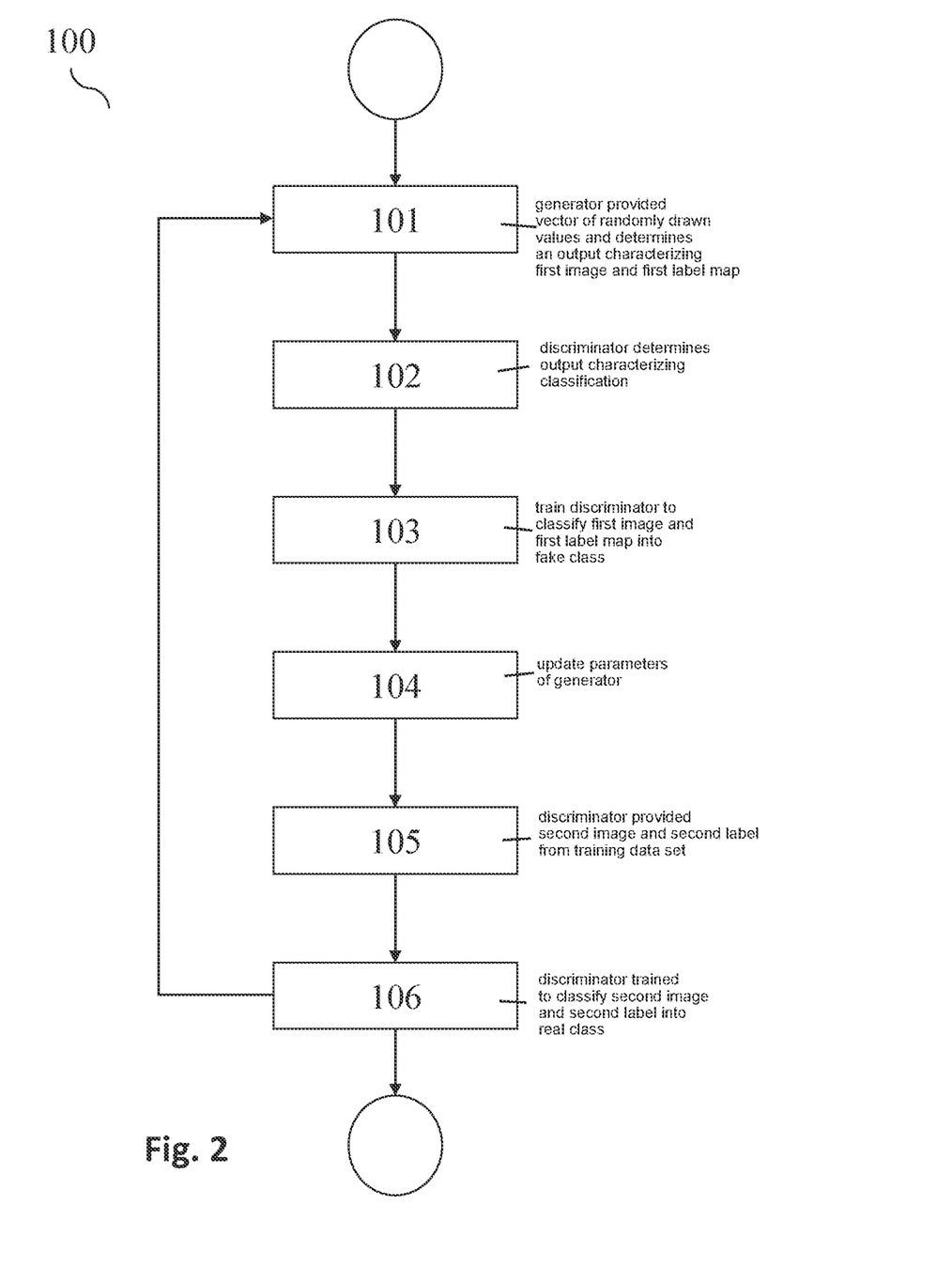
FIG. 2 shows a method for training the generative adversarial network, in accordance with an example embodiment of the present invention.

FIG. 2 schematically shows a method (100) for training the generative adversarial network (70).

In a first step (101), the generator (71) is provided a vector of randomly drawn values (R) as input and determines an output characterizing a first image (711) and a first label map (712).

In a second step (102), the discriminator (72) determines an output (y) characterizing a classification ($y_1$, $y_2$, $y_n$, $y_l$), possibly a plurality of classifications ($y_1$, $y_2$, $y_n$, $y_l$).

In a third step (103), the discriminator (72) is then trained to classify the first image (711) and the first label map (712) into the fake class. This is preferably achieved by means of a gradient descent algorithm. Each classification ($y_1$, $y_2$, $y_n$, $y_l$) characterized by the output may be provided to a respective loss function using the fake class as desired class for each loss function. For the classification regarding the layout, a binary cross entropy loss may be used as loss function, while for the other classifications characterized by the output a multinomial cross entropy loss may be used as loss function. Each loss function determines a loss value. The loss values may then be aggregated into a single loss value by means of a weighted sum. The single loss value may then be used as loss value for the gradient descent algorithm. Based on the loss value, gradients of parameters of the first unit (721) and/or the second unit (725) and or the convolution layer (722) and or the third unit (723) may then be determined, e.g., by means of automatic differentiation. The parameters may then be updated according to the gradient.

In a fourth step (104), the parameters of the generator (71) are updated based on the single loss value. For this, the gradient of the single loss value with respect to the parameters of the generator (71) is determined. This may, again, be achieved by means of automatic differentiation. For training the generator (71) the parameters of the generator (71) may then be updated according to the positive direction of the gradient, i.e., by gradient ascent.

In a fifth step (105), the discriminator (72) is provided a second image and a corresponding second label from a training dataset. The discriminator then determines an output for the second image and the second label map.

In a sixth step (106) the discriminator (72) is trained to classify the second image and second label map into a real class. This is preferably achieved by means of a gradient descent algorithm. Each classification characterized by the output for the second image and the second label map may be provided to a respective loss function using the class of the mask used for determining feature representations for the desired class of a respective feature representation. For the classification regarding the layout, a binary cross entropy loss may be used as loss function, while for the other classifications characterized by the output a multinomial cross entropy loss may be used as loss function. Each loss function determines a loss value. The loss values may then be aggregated into a single loss value by means of a weighted sum. The single loss value may then be used as loss value for the gradient descent algorithm. Based on the loss value, gradients of parameters of the first unit (721) and/or the second unit (725) and or the convolution layer (722) and or the third unit (723) may then be determined, e.g., by means of automatic differentiation. The parameters may then be updated according to the gradient.

The steps (101) to six (106) may then be repeated iteratively for a predetermined amount of iterations. Alternatively, training may be terminated if a predetermined performance metric, e.g., bits per dimension, falls below a predefined threshold.

Figure 3:
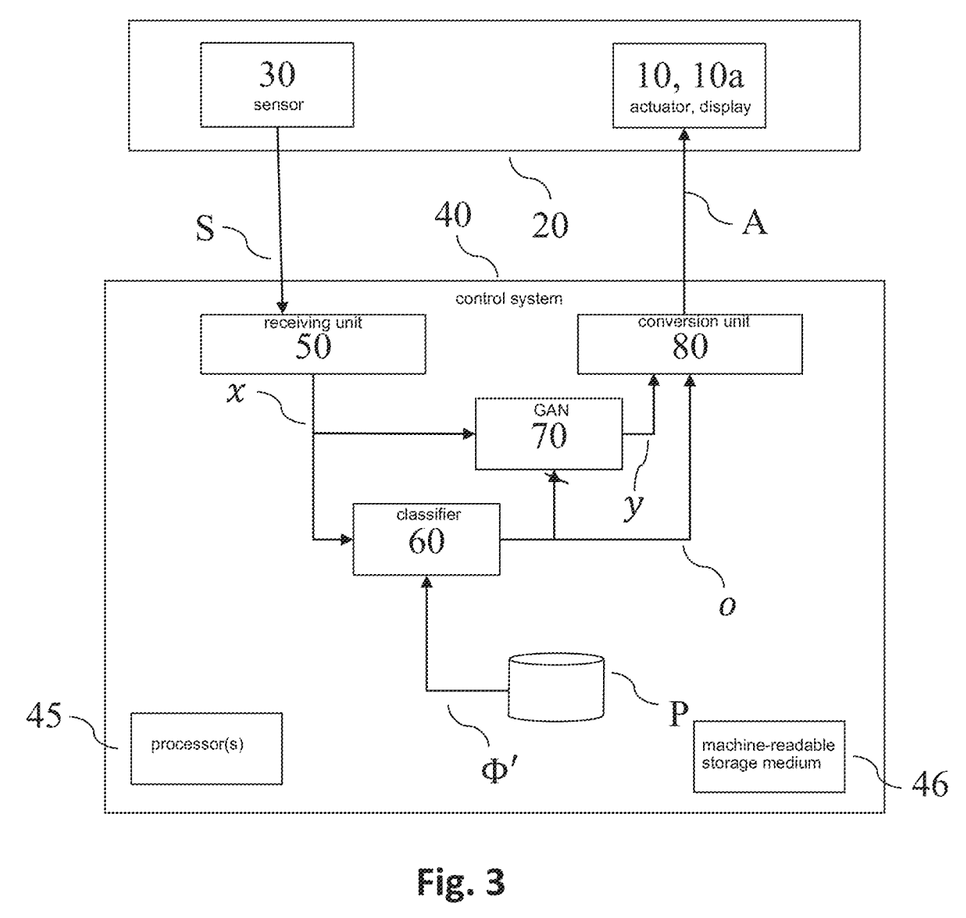
FIG. 3 shows a control system comprising the generative adversarial network, in accordance with an example embodiment of the present invention.

FIG. 3 shows an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. The sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to a classifier (60), which is configured for semantic segmentation or object detection.

The classifier (60) is parametrized by parameters ($\Phi$), which are stored in and provided by a parameter storage ($St_1$).

The classifier (60) determines an output signal (o) from the input signals (x), wherein the output signal (o) characterizes a semantic segmentation or an object detection of the input signal (x). The output signal (o). The output signal (o) is transmitted to a conversion unit (80), which converts the output signal (o) into the control signals (A). The control signals (A) are then transmitted to the actuator (10) for controlling the actuator (10) accordingly.

The input signal (x) and the output signal (o) are also provided to the generative adversarial network (70). The generative adversarial network (70) assesses whether the input signal (x) and output signal (o) characterize "real data", i.e., data that was used for training the classifier (60). For this purpose, the generative adversarial network (70) has been trained with the same data as the classifier (60). To put it in other words, the generative adversarial network (70) knows how the input signals (x) and output signals (o) should look. If it classifies the input signal (x) and output signal (o) as "fake data", this indicates that the data obtained from the sensor (30) may be critical, e.g., data which the classifier (60) was not trained for and hence a good classification result cannot be expected for or intentionally malicious data such as adversarial examples, and/or the classification as determined by the classifier (60) are inaccurate or false. The generative adversarial network classifies the input signal (x) and the output signal (o) by providing it to its discriminator (72), preprocessing the output signal (o) if it is not a semantic segmentation map in one-hot encoding. The output (y) of the discriminator (72) is then provided as output of the generative adversarial network (70) and also forwarded to the conversion unit (80).

The actuator (10) receives control signals (A) from the conversion unit (80), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
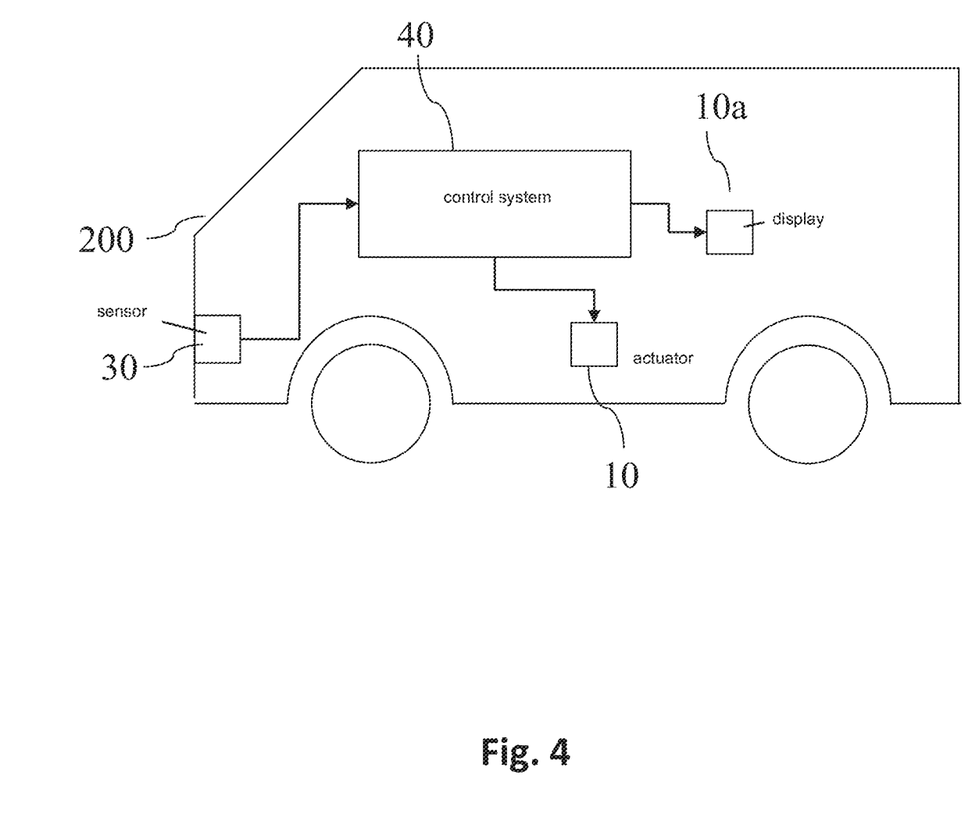
FIG. 4 shows the control system controlling an at least partially autonomous robot, in accordance with an example embodiment of the present invention.

FIG. 4 shows an embodiment in which the control system (40) is used to control an at least partially autonomous robot, e.g., an at least partially autonomous vehicle (200).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (200). The input signal (x) may hence be understood as an input image and the classifier (60) as an image classifier.

The image classifier (60) may be configured to detect objects in the vicinity of the at least partially autonomous robot based on the input image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (200), may be given by a brake, a propulsion system, an engine, a drivetrain, or a steering of the vehicle (200). The control signal (A) may be determined such that the actuator (10) is controlled such that vehicle (200) avoids collisions with the detected objects. The detected objects may also be classified according to what the image classifier (60) deems them most likely to be, e.g., pedestrians or trees, and the control signal (A) may be determined depending on the classification.

If a classification ($y_1$, $y_2$, $y_n$, $y_l$) comprised in the output (y) of the generative adversarial network (70) characterizes the fake class, the autonomous vehicle (200) may be controlled accordingly. This may mean handing over control to a driver or operator of the vehicle (200), assuming a safe state by, e.g., stopping in an emergency lane, lowering the speed of the vehicle (200), or submitting the input signal (x) and/or the output signal (o) to a specified location, e.g., a control center, for analyzing the input signal (x) and/or the output signal (o). Appropriate control of the vehicle (200) as exemplified above may also be triggered if at least a pre-defined amount of classifications ($y_1$, $y_2$, $y_n$, $y_l$) comprised in the output (y) of the generative adversarial network (70) characterize the fake class.

Alternatively or additionally, the control signal (A) may also be used to control the display (10a), e.g., for displaying the objects detected by the image classifier (60). It can also be imagined that the control signal (A) may control the display (10a) such that it produces a warning signal, if the vehicle (200) is close to colliding with at least one of the detected objects. The warning signal may be a warning sound and/or a haptic signal, e.g., a vibration of a steering wheel of the vehicle.

It is also possible that a driver or operator is notified by means of the display if a classification ($y_1$, $y_2$, $y_n$, $y_l$) comprised in the output (y) of the generative adversarial network (70) characterizes the fake class, e.g., by a suitable warning message stating that, e.g., the environment as detected may not be trustworthy.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements wherein N is the number of elements in the plurality, the elements are assigned the integers from 1 to N. It may also be understood that elements of the plurality can be accessed by their index.

What is claimed is:

1. A generative adversarial network, comprising:
a generator configured to generate an image and a corresponding label map; and
a discriminator configured to provide an output characterizing a classification of a provided image and a provided label map, wherein the classification characterizes whether the provided image and the provided label map have been generated by the generator or not and determines the classification by:
determining a first feature map of the provided image;
masking the first feature map according to the provided label map thereby determining a masked feature map;
globally pooling the masked feature map thereby determining a feature representation of the provided image masked by the provided label map, wherein:
the masked feature map is a plurality of matrices stacked along a depth dimension of a multi-dimensional tensor, and
the global pooling includes extracting the feature representation by extracting a single value from each matrix of the plurality of matrices; and
determining a classification of the provided image based on the feature representation,
wherein a control signal is generated based on the output, the control signal configured to control a physical action of a vehicle or a robot.

2. The generative adversarial network according to claim 1, wherein the provided label map characterizes a semantic segmentation of the provided image and a masked feature map is determined for a class characterized by the semantic segmentation.

3. The generative adversarial network according to claim 1, wherein the provided label map characterizes regions of the provided image and a masked feature map is determined for a class characterized by the regions.

4. The generative adversarial network according to claim 1, wherein the discriminator is further configured to determine the classification based on a second feature map, wherein the second feature map is determined by applying a 1×1-convolution to the first feature map.

5. The generative adversarial network according to claim 2, wherein the provided label map characterizes a class membership of pixels of the provided image.

6. The generative adversarial network according to claim 5, wherein the masked feature map is determined for the class characterized by the semantic segmentation or characterized by the region by setting pixels of the first feature map, which do not belong to the class, to zero.

7. The generative adversarial network according to claim 1, wherein the generator is configured to generate the image and the corresponding label map based on a randomly-drawn value.

8. The generative adversarial network according to claim 1, wherein the generator and/or the discriminator characterize convolutional neural networks.

* * * * *